United States Patent
Wilding

(10) Patent No.: US 9,720,954 B2
(45) Date of Patent: Aug. 1, 2017

(54) SYSTEMS, METHODS, AND APPARATUSES FOR FIXING LOGICAL OR PHYSICAL CORRUPTION IN DATABASES USING LSM TREES

(71) Applicant: SALESFORCE.COM, INC., San Francisco, CA (US)

(72) Inventor: Mark Wilding, Issaquah, WA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 15/438,952

(22) Filed: Feb. 22, 2017

(65) Prior Publication Data

US 2017/0177657 A1  Jun. 22, 2017

Related U.S. Application Data

(63) Continuation of application No. 14/210,217, filed on Mar. 13, 2014, which is a continuation-in-part of application No. 14/135,564, filed on Dec. 19, 2013.

(60) Provisional application No. 61/739,109, filed on Dec. 19, 2012.

(51) Int. Cl.
*G06F 17/00* (2006.01)
*G06F 17/30* (2006.01)

(52) U.S. Cl.
CPC .. *G06F 17/30371* (2013.01); *G06F 17/30303* (2013.01); *G06F 17/30377* (2013.01)

(58) Field of Classification Search
CPC ............ G06F 17/248; G06F 17/30893; G06F 17/30905; G06F 17/30584; G06F 17/3089
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

O'Neil et al., "The Log-Structured Merge-Tree (LSM-Tree)", 1996, pp. 1-32.

*Primary Examiner* — Truong Vo
(74) *Attorney, Agent, or Firm* — Morris & Kamlay LLP

(57) ABSTRACT

In accordance with disclosed embodiments, there are provided methods, systems, and apparatuses for fixing logical or physical corruption in databases using LSM trees including, for example, means for storing records in a LSM database at the host organization; processing transactions to the LSM database by writing the transactions into immutable extents for subsequent merge into the LSM database; recording a history of the transactions in a log; identifying corruption in at least one of the records of the LSM database represented within the immutable extents prior to use of the immutable extents in the LSM database; and correcting the identified corruption to the at least one of the records of the LSM database based at least in part on the recorded history of the transactions in the log during live operation of the LSM database. Other related embodiments are disclosed.

36 Claims, 11 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,374,264 B1 * | 4/2002 | Bohannon .......... G06F 11/1471 |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 8,977,898 B1 | 3/2015 | Veeraswamy et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2012/0011106 A1 | 1/2012 | Reid et al. |

\* cited by examiner

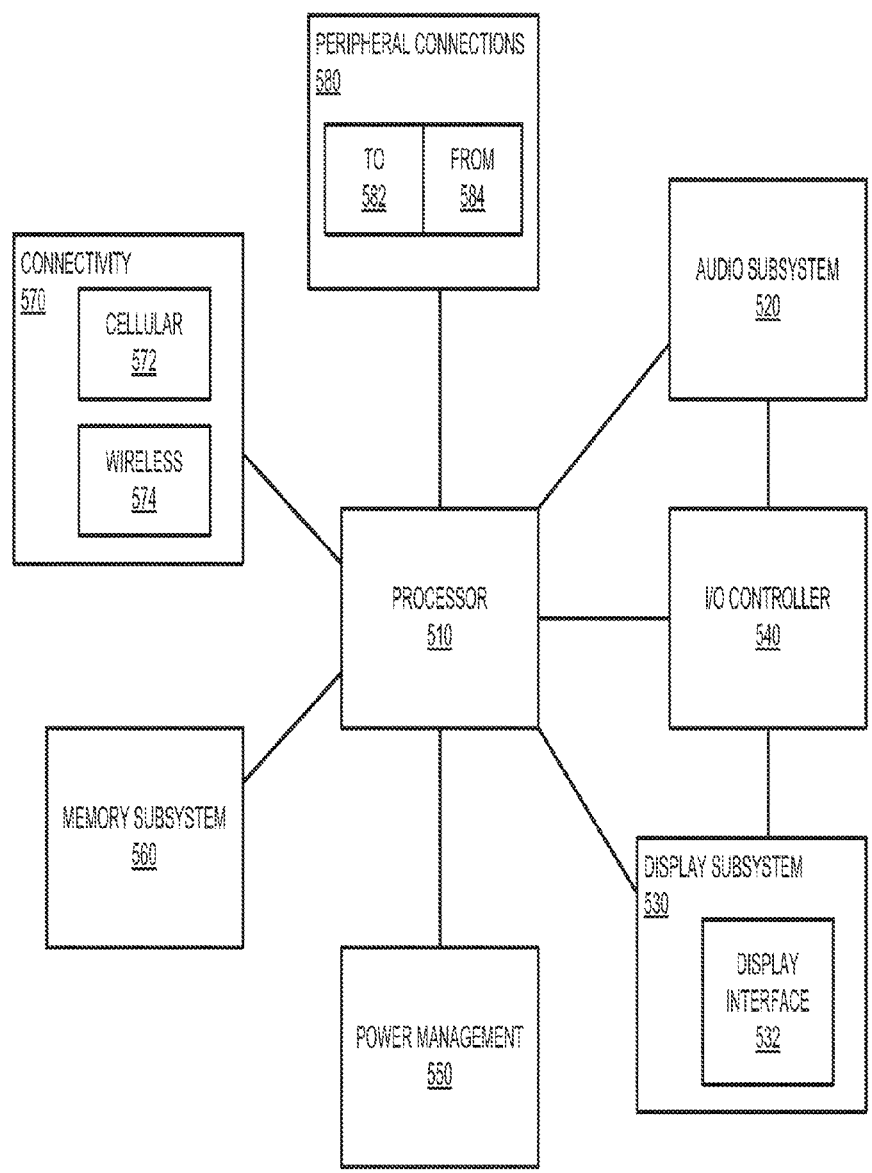

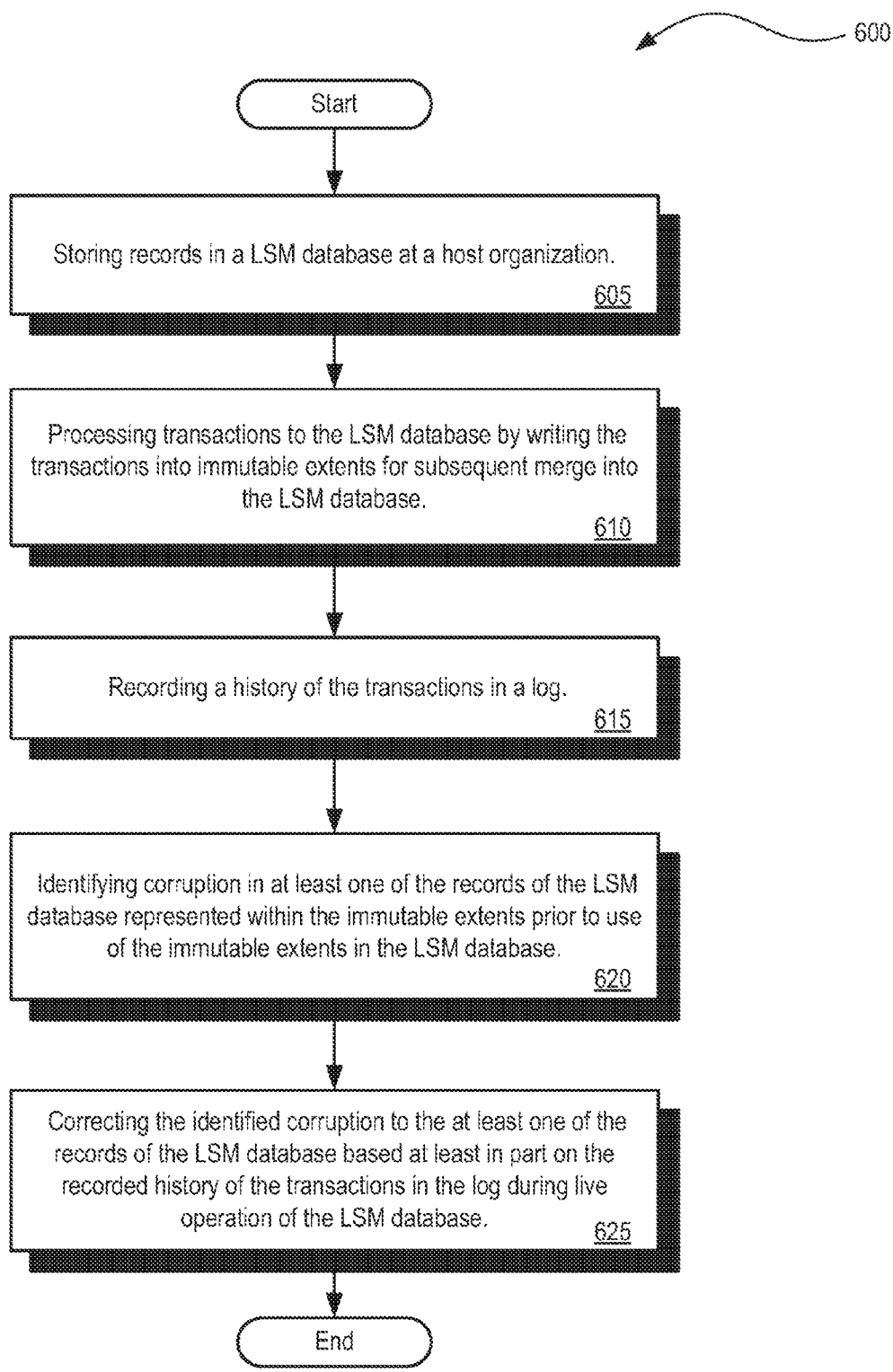

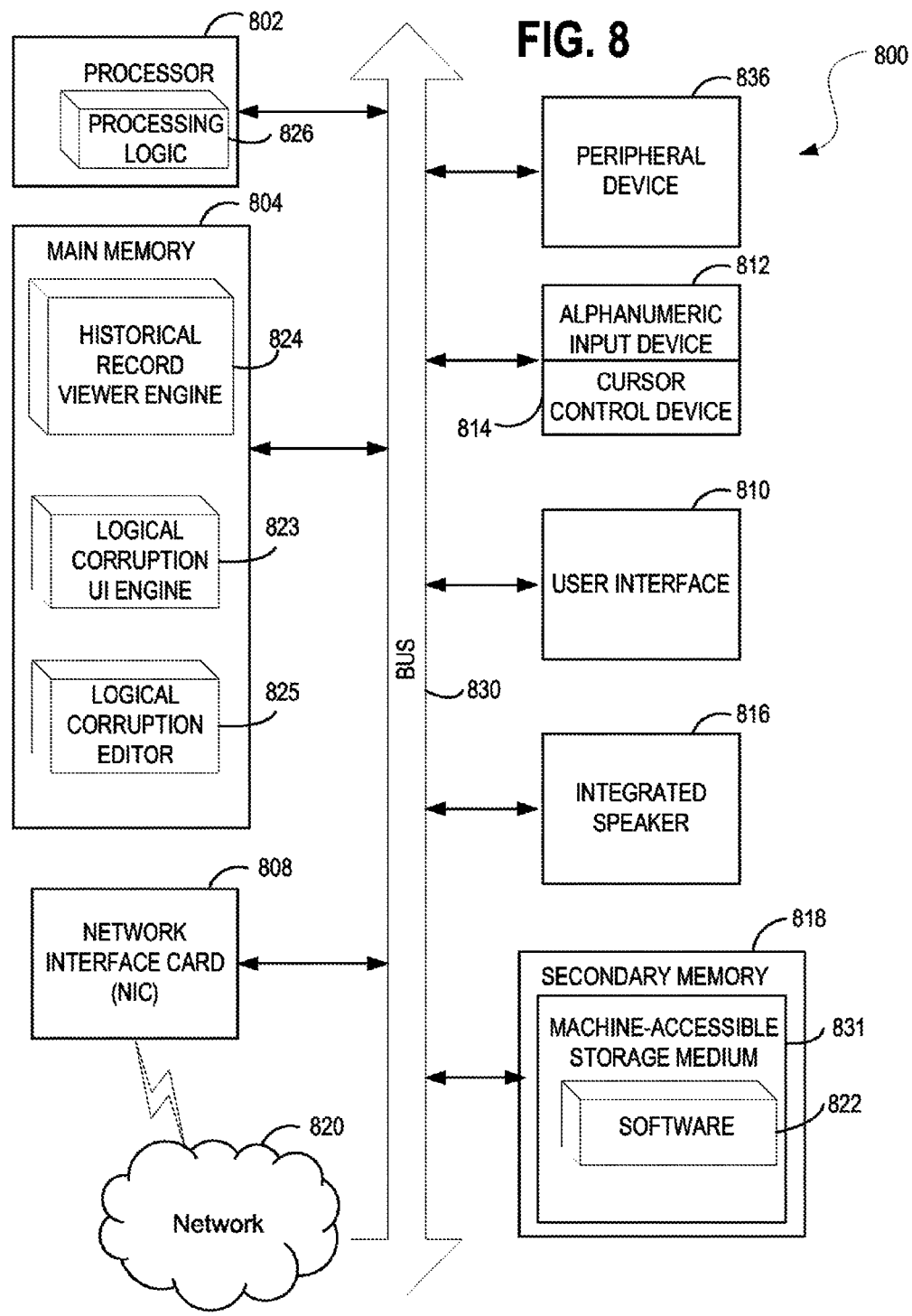

SYSTEMS, METHODS, AND APPARATUSES FOR FIXING LOGICAL OR PHYSICAL CORRUPTION IN DATABASES USING LSM TREES

CLAIM OF PRIORITY

This United States continuation patent application claims priority to U.S. patent application Ser. No. 14/210,217 entitled "SYSTEMS, METHODS, AND APPARATUSES FOR FIXING LOGICAL OR PHYSICAL CORRUPTION IN DATABASES USING LSM TREES," filed Mar. 13, 2014, the entire contents of which are incorporated herein by reference; and claims priority to U.S. patent application Ser. No. 14/135,564 entitled "SYSTEMS, METHODS, AND APPARATUSES FOR FIXING LOGICAL OR PHYSICAL CORRUPTION IN DATABASES USING IMMUTABLE LSM TREES," filed Dec. 19, 2013, the entire contents of which are incorporated herein by reference; and claims priority to, U.S. Provisional Patent Application No. 61/739,109 entitled "FIXING LOGICAL OR PHYSICAL CORRUPTION WITH IMMUTABLE LSM TREES," filed on Dec. 19, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for fixing logical or physical corruption in databases using LSM trees.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

A single multi-tenant database system operates to store data on behalf of a multitude of paying subscribers, each being a "tenant" of the database system, hence the term multi-tenant database system.

Within such an operational environment, computational efficiency, system responsiveness, and data integrity are all of paramount concern both to the provider of the multi-tenant database system and to the subscribers or tenants of such a system. Moreover, with on-demand technologies having multiple distinct clients simultaneously utilizing the system and relying upon its availability it is critical to avoid service outages which can create frustration on behalf of users.

Within conventional database systems, data corruption detected by the database engine software is considered a catastrophic event, as it should be, causing the database to very often "crash" rather than risk serving corrupted data in reply to queries. Some enterprise level databases do not crash and perform special isolation techniques instead. Nevertheless, a crashed database may be acceptable in a single tenant environment where one entity hosts their data on the database and is responsible for maintaining their own database internal to an organization because a catastrophic failure and database crash will result in only that particular tenant's users being affected but such a crash is wholly unacceptable in a multi-tenant database environment.

Consider the environment in which a multi-tenant database system operates as an on-demand or cloud based subscription service providing database services to tens of thousands of customers. A catastrophic failure in such an environment due to data corruption will affect a large number of customer organizations, their business operations, their users, customers of those businesses, and so forth. Even if a catastrophic failure is limited within a multi-tenant database system to a single server or some logical subset, the failure will still affect hundreds or thousands of customers having data on such a sub-set rather than only a single entity as would occur in a single-tenant database system. Further still, a single tenant of a multi-tenant database system cannot be permitted to trigger a database outage that could affect potentially thousands of other tenants of the same multi-tenant database system, each of whom are running their own businesses. It would be grossly unfair for a single tenant to detrimentally impact so many others in such a way.

Rectifying database corruption is additionally notoriously difficult and requires skilled database experts and technicians, which in turn leads to further cost and delay in the recovery of database services. At the same time, corruption in a database is a critical problem and cannot simply be ignored as returning corrupted data in reply to queries could have even more damaging results than returning no data at all due to a service outage.

The present state of the art may therefore benefit from the systems, methods, and apparatuses for fixing logical or physical corruption in databases using LSM trees as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 5B is a block diagram of an embodiment of tablet computing device, a smart phone, or other mobile device in which touchscreen interface connectors are used; and FIG. 6 is a flow diagram illustrating a method for fixing logical or physical corruption in databases using LSM trees in accordance with disclosed embodiments;

FIG. 8 illustrates a diagrammatic representation of a machine in the exemplary form of a computer system, in accordance with one embodiment.

DETAILED DESCRIPTION

Figure 1:
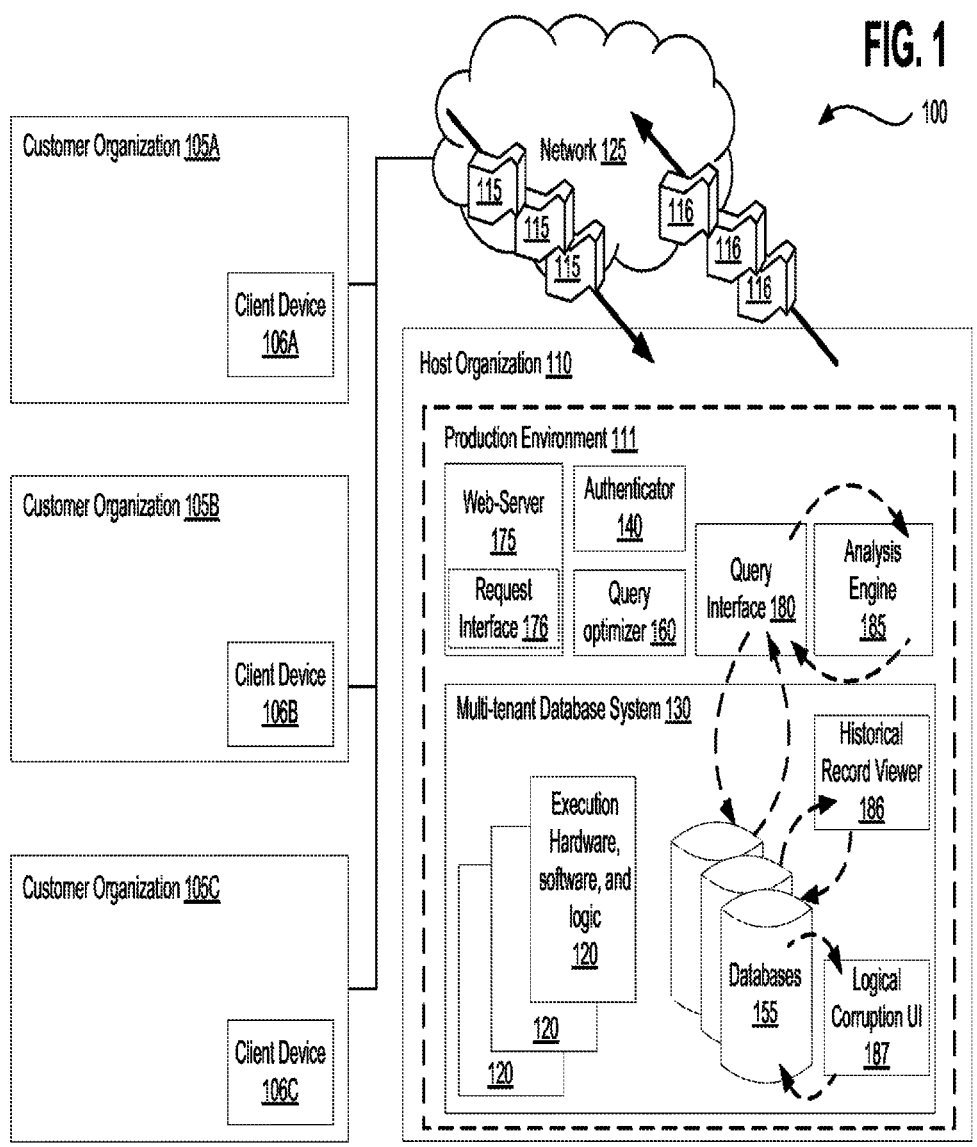
FIG. 1 depicts an exemplary architecture in accordance with described embodiments.

Described herein are systems, methods, and apparatuses for fixing logical or physical corruption in databases using LSM trees in an on-demand service environment. Such systems, devices, and methods may include, for example, means for: storing records in a LSM database at the host organization; processing transactions to the LSM database by writing the transactions into immutable extents for subsequent merge into the LSM database; recording a history of the transactions in a log; identifying corruption in at least one of the records of the LSM database represented within the immutable extents prior to use of the immutable extents in the LSM database; and correcting the identified corruption to at least one of the records of the LSM database based at least in part on the recorded history of the transactions in the log during live operation of the LSM database.

The LSM database is a Log-Structured Merge-Tree ("LSM-tree") type database in which the top level is level zero and represents the newest transactions to the database and in which subordinate or lower levels generally contain older transactions and data.

When transactions are committed to the database they are initially written to and stored within a transaction log file and subsequently a top level extent is created by the LSM database engine by flushing the contents of transaction log to create a new top level extent which is moved into level zero of the LSM tree as the top level extent. The contents of the top level extent will later move to lower levels as the LSM database engine periodically flushes the new contents from the transaction log to create new top level extents, thus moving prior top level extents to lower levels of the LSM tree through merge events. Merge events occur independently from the flush events. Subordinate or lower levels therefore also contain extents but are created by the LSM database engine moving the top level extent to a lower level by merging existing extents to create a new extent at a lower level. The purpose of the merge is to take content from higher level extents and move them into lower level extents. Merges which move content at higher levels to the lower levels occur to better organize the content in the LSM tree through merges and improved ordering.

Extents further down the LSM tree generally represent older data whereas the topmost level extent generally corresponds to the newest data having been inserted, updated, deleted, or otherwise changed by the most recently committed transactions to the LSM database as stored by the database's transaction log file up until a flush event.

Types of corruption that may occur within the LSM database include (a) external logical corruption, (b) internal logical corruption, and (c) physical corruption.

(a) External Logical Corruption:

External logical corruption may occur via the result of an SQL query or instruction in which, by way of example, a tenant or user accidentally deletes, inserts, updates, or otherwise inadvertently changes information stored by the LSM database. The change may occur as a result of an SQL query being run directly by the tenant or user or may be caused by the SQL being run indirectly, such as through an API or an application or user interface which executes such SQL queries on behalf of the user or tenant, but does so with the information provided, even when erroneous. Such erroneous information as provided by a user or tenant thus introduces an externally originated logical corruption or error into the LSM database. In such a situation, the SQL statement itself is syntactically correct and runs without error, the problem rather, is that the information itself is not correct. For instance, if the record for "Roger Watson" were to be deleted, but "Roger Smith" were specified, then the SQL would run correctly and without error, however, the deletion of the record would be erroneous, and thus constitute external logical corruption.

External logical corruption need not be attributable to the tenant or user of the LSM database, but may instead be the result of a malicious hacker deleting, inserting, updating, or otherwise changing records without the authority to do so. Such a hack need not even be to the LSM database itself or the host organization of the database, but rather, may be due to malicious attack through a user or tenant account. In such an event, where a hacker is able to successfully authenticate through a user's or tenant's account, they may execute syntactically valid SQL queries yet submit changes that are erroneous, thus and thus causing external logical corruption. In another scenario, it may be that an API or application is accessed by a hacker which itself has authority to execute SQL queries, and if erroneous information is submitted to that API or application, then again, the SQL would run correctly and without error as instantiated by the API or application, however, the resulting changes would be erroneous, and thus constitute external logical corruption.

In the case of External logical corruption, the underlying database engine has no native means by which to deal with such external logical corruption because the transactions conducted and the data stored is consistent and intact in a physical sense. The corruption results from the fact that the information is simply incorrect, rather than some transactional or processing error within the database itself. Accordingly, described herein are means through which a tenant may correct such external logical corruption, for instance, through the historical viewer allowing tenants to view who or what made changes to the database in conjunction with a logical corruption user interface enabling tenants to apply compensating SQL transactions directly or through an API or application to fix, update, or undo the erroneous changes made. Such compensating transactions may include, for example, adding a compensating record which is a newer version of an existing record and will thus take precedence over the erroneous record in which the newer version of the record effectively hides the older logically corrupted data. The older corrupted data will then be annihilated by the new record version on a subsequent merge. For instance, the new version of the record will be at higher levels of the LSM tree with the older incorrect version at a lower level in the LSM tree and when merge occurs, the older incorrect version of the record will be annihilated. Where both records exist, the older lower level and incorrect record will be superseded by the higher level newer version of the same record.

(b) Internal Logical Corruption:

Internal logical corruption may also occur but is outside the scope of the solutions which are described herein. For instance, internal logical corruption may occur when there is a mismatch between a table and its corresponding index.

(c) Physical Corruption:

Physical corruption may likewise occur within the LSM database when data is physically corrupted and cannot be used. This may occur due to problems with the underlying storage for the database, due to problems transacting with the database or the database engine, due to network errors, or due to a misconfiguration by a database administrator. Notwithstanding the existence of physical corruption, the LSM database may nevertheless remain online and accessible. Means for avoiding the physical corruption as well as repairing the physical corruption to the database are described in detail below and may include, for example, maintaining sufficient redundancy such that any top level extent of the LSM database may be re-created by replaying the generation of the corrupted top level extent from transaction logs or alternatively, lower level extents of the LSM tree may be re-created by re-merging extents to recreate an lower level extent determined to have physical corruption.

Extents of the LSM database periodically go through a merge process to create new extents. According to the described embodiments, sufficient redundancy in the LSM database is maintained so as to allow for re-merges and therefore re-create any data extent at any time necessary to overcome the discovery of physical corruption in the LSM database. According to certain embodiments, sufficient data within a transaction log is additionally maintained for the re-creation of a top level extent of the LSM tree which is not generated through merge events but rather, is generated by the LSM database engine flushing contents of the transaction log. Transaction logs may additionally be maintained to show and counter-act instances of external logical corruption when requested by a tenant or user as will be described further below. For instance, the operation of taking the transaction log content to create a top level extent may need to be re-done by, for example, performing a re-flush to replace the existing top level extent. Such a re-flush may be triggered external to the control of the LSM database engine.

Both physical and external logical corruption is fixed during live operation of the LSM database without taking down or crashing the LSM database. This includes the re-creation of lower level extents through re-merge events, re-creation of top level extents through replay of transactions, and the generation and issuance of compensating transactions for identified external logical corruption. Through such means, it is possible to provide increased LSM database uptime and availability to the tenants and users of the database, thus avoiding costly database downtime which may negatively impact the business operations of the tenants of the database.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architecture 100 in accordance with described embodiments. In one embodiment, a production environment 111 is communicably interfaced with a plurality of client devices 106A-C (e.g., such as mobile devices, smart phones, tablets, PCs, etc.) through host organization 110. In one embodiment, a multi-tenant database system 130 includes databases 155, for example, to store tables, datasets, and underlying database records with user data on behalf of customer organizations 105A-C or users.

Multi-tenant database system 130 includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand database services or cloud computing services to subscribing customer organizations 105A-C.

Host organization 110 receives input and other requests 115 from a plurality of customer organizations 105A-C via network 125 (such as a public Internet). For example, incoming database queries, API requests, interactions with displayed graphical user interfaces and displays at the client devices 106A-C, or other inputs may be received from the customer organizations 105A-C to be processed against the multi-tenant database system 130, including queries to read, write, and update data stored within the databases 155.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 and provide a web-based interface or other graphical displays to an end-user client device 106A-C or machine originating such data requests 115.

Authenticator 140 operates on behalf of the host organization to verify, authenticate, and otherwise credential users attempting to gain access to the host organization.

Query interface 180 provides functionality to pass queries from web-server 175 into the multi-tenant database system 130 for execution against the databases 155 or other data stores of the host organization's production environment 111. In one embodiment, the query interface 180 implements an Application Programming Interface (API) through which queries may be executed against the databases 155 or other data stores. Query optimizer 160 performs query translation and optimization, for instance, on behalf of other functionality such as functionality of a graphical interface which possesses sufficient information to architect a query yet lacks the necessary logic to actually construct the appropriate query syntax. In other instances, query optimizer 160 modifies a submitted query to optimize its execution within the host organization without affecting the resulting dataset returned responsive to such an optimized query. Analysis engine 185 operates on behalf of functionality within the host organization to perform additional data evaluation where necessary.

Host organization 110 may implement a request interface 176 via web-server 175 or as a stand-alone interface to receive requests packets or other requests 115 from the client devices 106A-C. Request interface 176 further supports the return of response packets or other replies and responses 116 in an outgoing direction from host organization 110 to the client devices 106A-C.

Historical record viewer 186 and logical corruption user interface (logical corruption UI) 187 are further depicted as interacting with the databases 155. The historical record viewer 186 enables users to view past transactions at the databases as well as the past or historical state of data reflected by their database records. In certain embodiments, the logical corruption UI 187 translates low level log information from the transaction log into tenant specific views for display at the historical record viewer 186 and logical corruption UI 187. Logical corruption UI 187 enables users to select past transactions to the databases to revert or modify, as well as view what impact upon other records their proposed changes may cause and then to confirm compensating database transactions to correct logical corruption as will be described in additional detail below.

Changes available for view by any particular database tenant or user are restricted to their view of the data in the database as controlled by conventional access restrictions, ownership, and responsibility for such data. Thus, one tenant cannot see the data of another tenant unless they are given access rights to view such data, for instance, through membership in a group, express permissions for a user, permissions for users affiliated with a tenant, express sharing designations, or other such access rights. Thus, according to certain embodiments, both OrgID and UserID are included within the transactions logs to correctly align access rights to the view granted to any user via the historical record viewer 186 and the logical corruption user interface 187.

Figure 2:
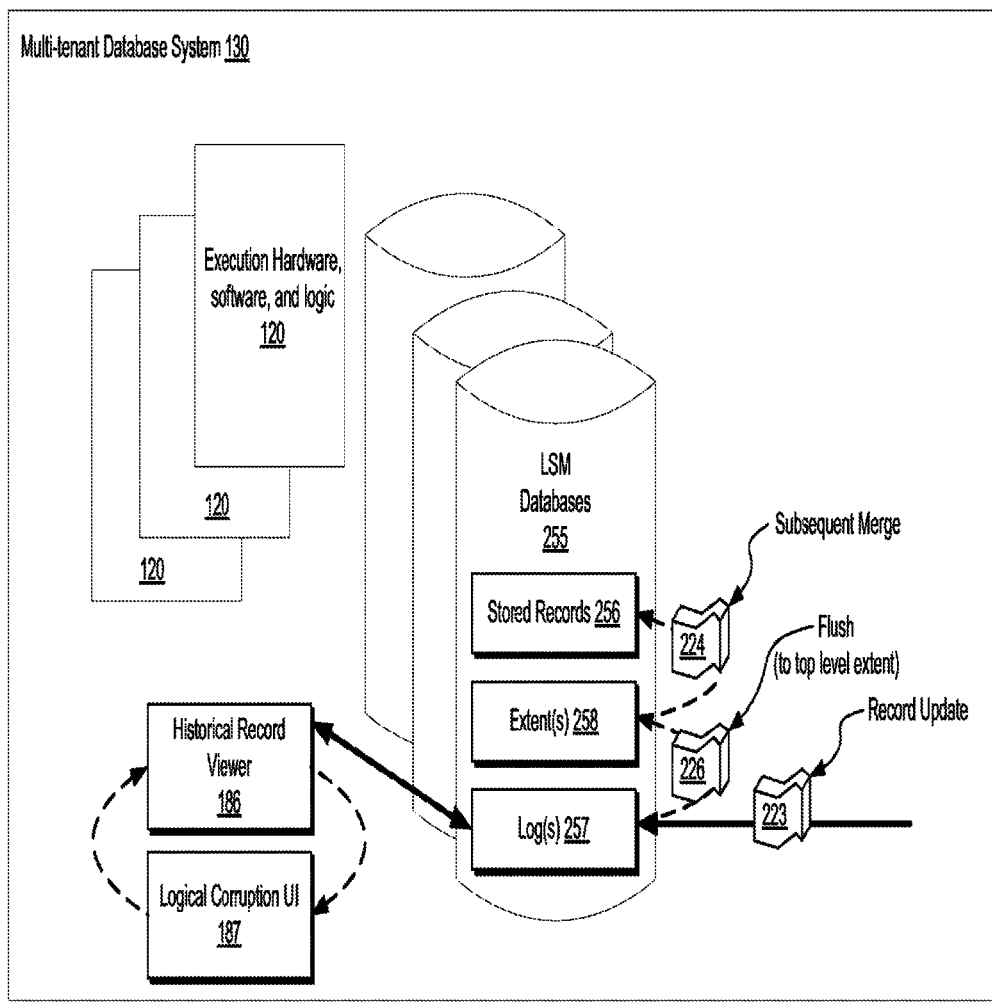
FIG. 2 depicts another exemplary architecture in accordance with described embodiments.

FIG. 2 depicts another exemplary architecture 200 in accordance with described embodiments. Depicted here the execution hardware, software, and logic 120 of the multi-tenant database system 130, but additionally depicted are LSM databases 255 operating as data stores for the multi-tenant database system 130. The historical record viewer 186 is again depicted which interacts with the logs 257 of the LSM database 255 and further interacts with the logical corruption user interface 187.

According to the described embodiments, the LSM database 255 contains stored records 256 and operates by recording committed transactions into the LSM database logs 257 until a flush occurs at which time the LSM database engine creates a new top level extent of the LSM database. Existing extents may be merged to create new extents at lower levels than the top level, with all of the extents storing the data of the database as stored records 256. The stored records 256 of the database are stored within database blocks. Database blocks in turn are contained within the database extents. Extents are groups of blocks that contain groups of rows. The stored records 256 are the changes to the database including inserted rows, updated rows and deleted rows.

Subsequent processing merges new top level extents 258 into the pre-existing extents at the lower levels of the LSM tree within the LSM database 255, for instance, by collapsing updates and modifications to rows, effecting new row insertions, updates, and deletions. As depicted at FIG. 2, a record update 223 transaction is written into the logs 257 of the LSM databases 255 when committed. Subsequent processing by the LSM database engine triggers a flush 226 into the top level extent and then a subsequent merge 224 causes the record update 223 flushed 226 to the top level extent to be merged into the stored records 256 at extents of subordinate levels.

Many conventional databases operate utilizing an update-in-place methodology in which any changes to the database requires the database engine to read out an affected record, update the record, and write the updated record back into the database at the correct location. With an update-in-place database the database blocks are not immutable, that is, they can be changed. Tables are a logical construct on top of the database blocks but the records have to be written to database blocks thus changing an existing block to a new version within an update-in-place database. Records and rows are written to a block and will typically remain in that block until changed or until the update-in-place database is reorganized. LSMs databases on the other hand defer placement of the records and continuously move records as part of merge processing. Record inserts to such update-in-place databases must be written into the correct location in the correct block at the time of insertion, changing the version of the block, and similarly, record deletions must remove the correct record from the correct block at the time of deletion, again changing the version of the block.

Logging exists for such conventional update-in-place database systems with enough information to repeat the entire operation if the direct write to the block gets interrupted mid-way through (e.g., by a system crash) via an operation called "replaying" the log, thus requiring that each transaction in an update-in-place database be written to disk twice: once to the log, and once into the persistent location within the correct database block of the update-in-place database. Notwithstanding the logging by update-in-place databases, the transactions are effected into the database at the exact and persisted location at the time that the transaction occurs.

If a block becomes corrupted in such an update-in-place database the entire database will often crash to prevent the corruption from spreading, although as noted above, some enterprise level databases implement database block isolation schemes to prevent crashing. Such enterprise level databases can sustain corruptions and even self-repair themselves under certain circumstances, such as by recreating an index, although such technology is extremely expensive to implement. For instance, certain self-repair implementations utilize a second such enterprise system with a fully redundant set of data that is synchronized and available at all times such that the redundant set can be used to repair corruption. Certain mainframe databases also will sustain corruption without crashing such as those systems support financial transactions, but again, the technology is extremely expensive to implement. For instance, banks and stock markets may operate such mainframe databases.

An interesting case may occur in an update-in-place database where a database block is damaged then because of the damage, it is unknown which of the thousands of tenants having data stored on the database may be affected by such damage. Such a problem is especially true where a scanning query encounters a corrupted block. Without knowing which tenants are in the block, the scan must fail to avoid returning an incorrect SQL statement result.

Conversely, with an LSM database where the extents and blocks have ordered blocks with ordered tenant data within them it is at least knowable which tenants may be associated with and thus affected by a corrupted block and thus, it can then be decided whether or not the scan should continue or error out based on whether the particular tenant running the scan is one of those that would be affected by the corruption to that block. The corrupted block may not be encountered in the first place if the LSM database determines first that the tenant for which the scan occurs has no data within the block, thus permitting the block to be skipped without being scanned. If the block were not skipped and was physically corrupt, then it would be mandatory to return an error because it is impermissible to return corrupted or partial data responsive to the query.

For instance, even if the block is corrupted or entirely lost it is still possible to determine whether a tenant executing the can will be affected by the corruption because the scan logic can look to immediately adjacent blocks within the extent to see the ordering of tenants and the range of tenants could potentially be affected by the lost or corrupted block. In such a situation, scanning can therefore continue without error where it is determined that a tenant executing the scan does not fall within the range of potentially affected tenants, or error out when appropriate should the tenant unfortunately fall within the range. If tenants do fall within the range then the corruption can at least be identified and trigger corruption rectification procedures be that a replay, compensating transaction, extent replacement, etc.

In accordance with certain embodiments therefore, the LSM database orders records in blocks by tenant within extents. In such an embodiment, scans will naturally skip over blocks that are not needed, made possible by the ordering which not only greatly improves scan performance but additionally permits tenants having no association with a block of an extent or an extent as a whole, to benefit from scans that continue successfully scanning as long as they are orthogonal to the corrupted block data, notwithstanding the presence of corrupted blocks in the ordered LSM database. In such a way, the LSM database continues to operate in a live production state capable of transacting on behalf of tenants whose blocks are not afflicted with such corruption.

The ability for the LSM database to continue in a live operational state notwithstanding the presence of corrupted blocks is critical to the nature of the multi-tenant database system environment which services tends of thousands of diverse customers concurrently. Consider for example a large database within the multi-tenant database system having an exemplary 30 TB of data hosted on behalf of 1000 tenants. The particular corruption issue may reside within a block that affects just a single one of the 1000 tenants or perhaps a dozen or so of the tenants, yet with conventional update-in-place databases, the corrupted block will trigger the entire database to crash (assuming it is not a corruption resilient enterprise database) thus taking all 1000 tenants offline for a problem that approximately ~99% of the tenants do not care about and for which such tenants may never be directly affected by the corruption because they are in no way affiliated with the data block found to be corrupted.

Consider further a database supporting millions of financial customers simultaneously, such as within a banking and finance environments. Crashing the database for corruption at a single block would be flatly unacceptable as doing so could cause disastrous financial repercussions for the bank or even the larger economy depending on the scope and nature of the financial transactions supported by the system. For instance, consider the havoc should Visa and Master- Card's entire transaction processing system crash or worse yet, damage to financial markets should a stock exchange crash. Therefore, an update-in-place database in such an environment may maintain the system's availability rather than crashing upon the detection of a corrupted block and instead attempt to isolate the corruption from non-affected customers during the database's operational runtime so that the single corrupted block, and the few customers affected, can be remedied without triggering a full-blown service outage. Blocks or extents may be determined to be corrupted based on error detecting code, such as use of a cyclic redundancy check (CRC) computation, such as CRC-64, or other available variants.

Unfortunately, resolving corruption in such a situation is enormously complex due to the nature of the update-in-place database's propensity to be constantly changing the blocks within which records are stored as the database transactions are processed. While the update-in-place database continues operating, transactions are constantly updating the persisted location of data in the database this making it very risky and technically complex to rectify corrupted blocks without taking the database offline.

In order to fix the corruption it necessary to obtain or reconstruct the correct version of a database block. Reconstructing the incorrect version will introduce difficult to detect logical corruption which is in of itself a disastrous consequence to the data integrity of the database, yet to make matters worse, the logical corruption resulting from reconstructing the wrong version of the corrupted block will then logically propagate across the database in a manner that is extremely difficult to predict and potentially impossible to subsequently detect rendering the full impact of the corruption potentially unknowable. For instance, block reads are not logged or tracked and as such, there would be no record of those transactions having pulled data from the logically corrupted block, used that data in some way within an application layer separate from the database, and then written data back into the database having been indirectly affected and corrupted by the erroneous block version reconstruction. For instance, if perhaps a person's salary record is corrupted, and then a manual update to fix the corruption enters incorrect data, the erroneous block version update will logically corrupt that block but render it physically valid, appearing as though the corruption is fixed, yet could unknowingly give somebody a raise or reduction in salary, or remove their salary completely, or allocate their salary to another person, etc.

For these reasons, correcting corruption on a live operational update-in-place database, while possible, is a difficult and dangerous proposition that typically requires very skilled and expensive experts as well as support from the database vendor all while risking the introduction of new logical corruption into the database.

LSM database 255 technology is fundamentally different than update-in-place database technology. A LSM or LSM-tree type database is a "Log-Structured Merge-tree" type database and does not write updates, deletions, or insertions directly into the persisted location at the time of the transaction as is done with an update-in-place database. Instead of writing the database transactions into the persisted location in the database and separately writing the entry into a log as is done with an update-in-place database, an LSM database 255 simply writes the database transaction into a transaction log upon commit and the LSM database engine later flushes the transactions from the transaction log into a new top level extent within the LSM tree. The contents of the transaction log represent the changes to the database which are then flushed into to top level extent. Notably, however, the writing of the transaction into the transaction log upon commit satisfies the transactional interaction between the API, the application, or the SQL statement with the LSM database, in which the flush occurs as a subsequent event. Stated differently, committing a transaction to an LSM database requires only the committed transaction being written to the transaction log and it is not necessary for a flush to have occurred for the transaction to be complete.

Each extent 258 contains one or more blocks of data ("blocks" are sometimes also referred to as pages or fragments). If the LSM database 255 were to use only blocks then there would be millions of blocks to track and data would become increasingly difficult to find with organizational overhead costs increasing dramatically. By placing blocks into extents 258, each having, for example, 32768 blocks, then the computational performance of organization and indexing to find data is improved dramatically. This is necessary because notwithstanding the fact that record updates 223 and other transactions are written to the extents 258 before subsequent merge operations, follow-on queries to the stored records 256 of the LSM database 255 must accurately reflect the state of the data stored within them, regardless of whether the latest version of the record exists only within the yet to be flushed transaction log, within a new top level extent in the LSM tree, or within a subordinate level of the LSM tree within an extent having gone through one or more merge events.

The LSM database system engine can be thought of as a lazy accountant. Rather than locating the exact row in a table, reading it out, updating it, and writing it back into the proper and persisted location at the time of the transaction, as is required by the update-in-place database, the LSM database's lazy accountant instead writes committed transactions immediately into a transaction log until a flush occurs to the top level extent. The logs are utilized for recovery such that if the database crashes then the logs are replayed to create the top level extent that was never created and then subsequent merges are performed to improve the ordering of the data. This results in many small "extents" 258 which include database transactions (e.g., such as the record update 223) that need to subsequently be inserted or updated into the LSM database's LSM tree at a later time, through a process called merging 224.

Therefore, if a transaction for an LSM database deletes a record from the database, the deletion will be written first into the transaction log and subsequently flushed into an extent 258 but an extent does not need to be generated immediately resulting in the stored record 256 remaining within an older extent, now superseded by the delete transaction written to the transaction log. Subsequent processing of the LSM database will flush the delete transaction into a new top level extent and subsequent merge processing will merge the deletion of the record with the extent having the stored record 256 persisted therein, resulting in a new merged extent within which the deletion is effected and thus, the stored record 256 no longer exists and the delete transaction is no longer necessary, each essentially annihilating the other. Subsequent to merging 224, the pre-merge extent 258 is no longer required and is therefore deleted or marked for deletion. Any extent used for a merge which is marked for deletion and thus may permissibly be deleted without harming the database's operation, may nevertheless be retained for the purposes of redundancy such that if an existing extent requires re-creation then the prior merge may be replayed to recreate the extent which has been found to be corrupted. Similarly, the transactions in the transaction log may also be retained for redundancy, even after a flush event, such that the top level extent may also be re-created by replaying the retained transactions.

Figure 3:
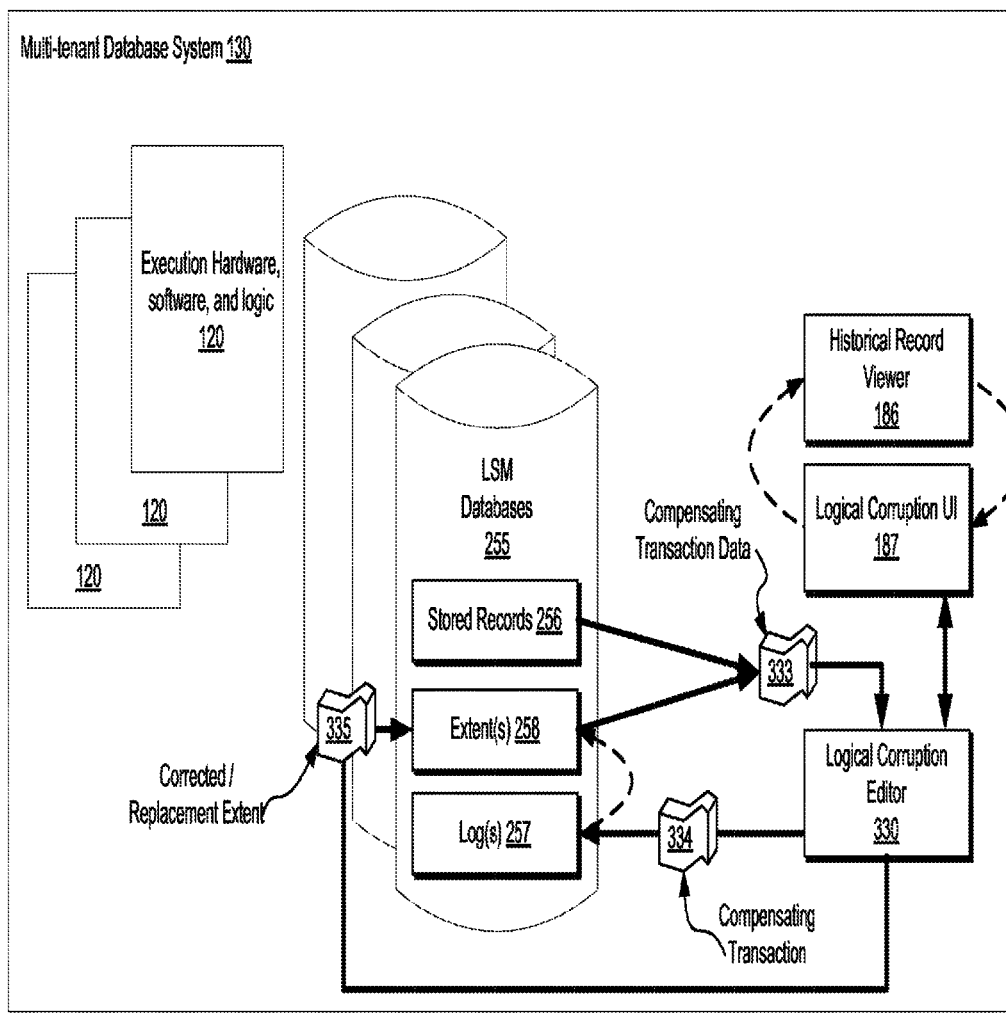
FIG. 3 depicts another exemplary architecture in accordance with described embodiments.

FIG. 3 depicts another exemplary architecture 300 in accordance with described embodiments. As before, there remains the execution hardware, software, and logic 120 of the multi-tenant database system 130 and the LSM databases 255, its stored records 256, logs 257, and extents 258. Additionally depicted is the logical corruption editor 330 which interacts with the logical corruption user interface 187 and the historical record viewer 186 to present historical changes to the user such that the user may determine whether or not logical corruption exists in the database (e.g., erroneous data is recorded) and then easily correct such logical corruption via the tools provided.

With the LSM database 255, the transactions written to the logs 257 may be stored for redundancy after the transactions are flushed into a new top level extent and previously merged extents at lower levels of the LSM tree which are marked for deletion post merge may also be stored for purposes of redundancy. These stored logs 257 and previously merged extents enable a view into the past when compared with the current state of the database to determine what changes to a tenant's stored data were made as well as compensating transactions to be issued to correct for logical corruption or a replay of past transactions to re-create a merged extent that has been identified as having physical corruption. While it may be infeasible to store all transactions in the logs 257 and all previously merged extents indefinitely, it is practical to store several weeks or even months worth of transactional logs and previously merged extents, thus permitting replay or review and correction for any transaction during that past period of time as reflected by the available transaction logs and past previously merged extents. In such a way the transaction logs and previously merged extents that are stored despite being marked for deletion from the LSM tree provide for data redundancy within the system enabling a variety of mechanisms to fix external logical corruption as well as physical corruption in an LSM type database, as described herein.

As depicted here, the logical corruption editor 330 enables a user (e.g., via the logical corruption UI 187 and historical record viewer 186) to view and retrieve compensating transaction data 333 from either the stored records 256 or the logs 257, or both, and then via the logical corruption editor 330 a compensating transaction 334 can be generated and issued to the LSM databases 255 to correct or counteract external logical corruption.

As noted previously, committed transactions written to a transaction log for the LSM database 255 are flushed into an immutable extent 258 at the top level of the LSM tree representing the database changes that will subsequently be merged into lower levels of the LSM database. The top level extent 258 cannot ever be modified, thus, it is an "immutable" extent. Instead, the new top level immutable extent exists until the LSM database merges the database changes represented at that top level immutable extent into other extents within the LSM tree, at which point the top level immutable extent is no longer required or relevant and thus is marked for deletion from the LSM tree. Although marked for deletion, previously merged extents, such as the top level extent now marked for deletion is kept for the sake of redundancy such that it may be utilized to correct physical corruption, for instance, by replaying the old extents marked for deletion to re-create a current extent of the LSM tree found to have physical corruption.

Thus, unlike the update-in-place database which is in a constant state of change due to the updates being transacted at the time of commit to the persisted location for a stored record, the LSM database 255, if corrupted in a physical sense, will localize that physical corruption to a particular extent 258 yet to be merged, at least for a period of time. Resolving physical corruption within the LSM database 255 while it remains live and operational is therefore much more feasible than with the update-in-place database. For instance, once physical corruption is identified, it can be resolved by remerging or recreating an extent from the transaction logs or previously merged extents marked for deletion but stored for redundancy. Specifically, the top level extent of the LSM tree can be recreated from the transaction logs and extents at lower levels of the LSM tree created through prior merges can be recreated by replaying those prior merges using the previously merged extents that were marked for deletion but stored by the system for the sake of correcting such physical corruption to them.

Thus, in the case of physical corruption, a replacement extent 335 at the top level is re-created by replaying the necessary transactions as recorded by the logs 257 or by re-merging previously merged extents to re-create the replacement extent 335 at subordinate levels.

Logical corruption is handled differently. For logical corruption, a compensating transaction 334 is written to the transaction log which will then be flushed by the LSM database engine into the newest top level extent 258 without having to replace any existing pre-merge extent. In such a case, the compensating transactions 334 will simply counter-act the corrupting transaction. In certain embodiments, the compensating transactions 334 is processed through the API or application used to insert, update, or delete the prior transaction to ensure that any necessary application or API level changes to the data is also accommodated by the compensating transactions 334 so as to avoid causing further logical corruption.

Figure 4:
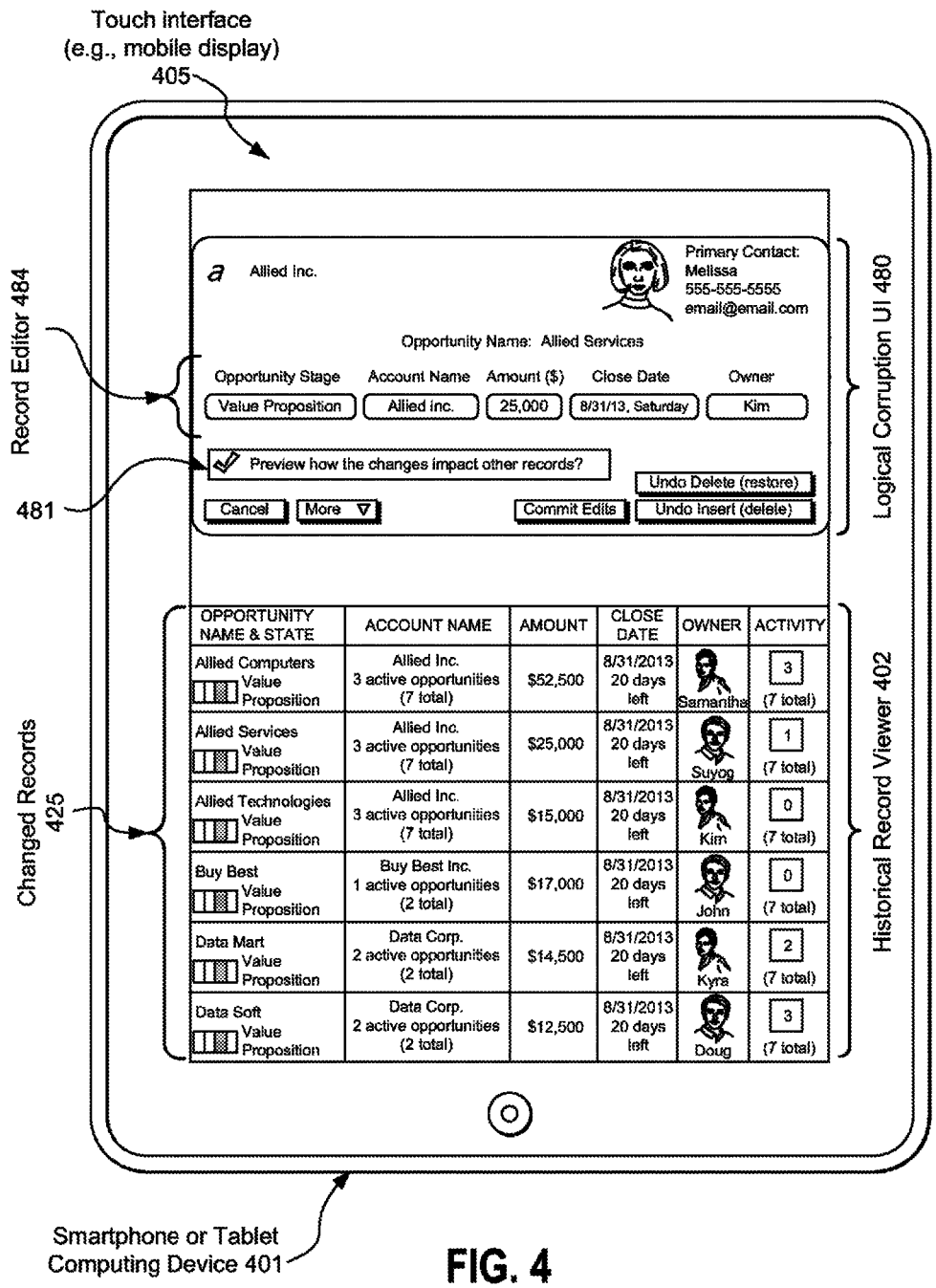
FIG. 4 depicts an exemplary graphical interface operating at a mobile, smartphone, or tablet computing device in accordance with the embodiments.

FIG. 4 depicts an exemplary graphical interface operating at a mobile, smartphone, or tablet computing device in accordance with the embodiments. In particular, there is depicted a smartphone or tablet computing device 401 having embodied therein a touch interface 405, such as a mobile display. Presented or depicted to the mobile display 405 is the historical record viewer 402 in which the various changed records 425 are depicted to a user via the display and additionally presented or depicted to the mobile display 405 is the logical corruption user interface 480 with a record editor 484 from which a user can select one of the changed records 425 from the historical record viewer 402 and then modify the selected changed record at the logical corruption user interface 480 via the record editor 484. For instance, the user can, via the mobile display 405, change the values of the selected changed record at the record editor 484, restore the record via the undo delete button, delete the record via the undo insert button, commit edits entered to the record editor 484, cancel, or select from various other options appropriate for the UI. At element 481 the user can also select the option to preview how the proposed changes impact other records.

The LSM database 255 stores logical information about where data is stored whereas an update-in-place database conversely stores physical information about where data is stored. Therefore, embodiments further benefit from the LSM's structure by permitting users to undo or compensate for erroneous transactions or even malicious transactions carried out by, for example, a disgruntled employee or a hacker having gained illicit access to the user's account or the customer organization's data. For example, a disgruntled employee or hacker may go into a database and delete records or modify data, such as salary information, etc. These changes are perfectly valid in a physical sense. That is to say, they are transacted to the database and written to the proper location regardless of whether the database is an update-in-place or LSM database. However, such changes represent logical errors, which can be corrected as described herein by reviewing or replaying available logs to show what changes were made via historical record viewer 402 and logical corruption UI 480 and then permitting the user to undo those changes through compensating transactions 334 via the functionality of the logical corruption editor 330 as set forth at FIG. 3.

Take for example a hacker that somehow takes over the tenant's account and changes the phone number for a given contact. Upon finding the data error (for instance, upon trying to phone the contact and discovering the wrong number), the tenant or an authorized user for that tenant could review the changes over time from their perspective including changes to that particular contact. The tenant may then find, for example, that at 3:31 AM, someone using the user's valid credentials changed the contact's phone number. The customer would be able to "undo" this change in the database which would take the form of a compensating transaction against the LSM database, for instance, by issuing an SQL update via the user interface that changes the phone number back to its original and correct form.

Consider another example in which a user's account was accessed at 3:31 AM by a hacker with a variety of database transactions issued against the LSM database from the user's account. As noted previously, such transactions are perfectly valid from a physical sense, but may very well represent logical corruption in the database due to the fact that the transactions are unwanted and erroneously applied to the database. In certain embodiments the user is notified of transactions out of the ordinary, such as edits being made to the customer organization's data at an odd time, such as outside of business hours (e.g., at 3:31 AM) or if the edits are being originated by a user at a location or IP address which does not match prior or expected usage. These and other means may bring to the user's attention the fact that some logical corruption may have been introduced into the database.

Using the logs, the historical record viewer 402 presents user a user with a display showing all transactions made within a period of time. For instance, via the interfaces presented at the mobile display 405 the user can select changed records 425 ranging in time from, for example, 3:00 AM to 6:00 AM, causing the display and UI logic to retrieve those transactions from the log and display them to the user for review or editing via record editor 484. The LSM database itself possesses no knowledge that such properly executed transactions represent logical corruption, however, the user, customer organization, or tenant having ownership or responsibility for such data would have intimate knowledge of the data. Such persons can retrieve the data and review it for correctness. If such data is incorrect, then according to described embodiments, the user can select via the UI which records to revert, for instance, by checking check boxes, or highlighting records, clicking the appropriate buttons, etc. The UI will then institute the proper compensating transactions on behalf of the user (e.g., reading the records at a time prior to the 3:00 AM hack and re-updating them or re-inserting them with the proper data record, etc) to revert the LSM database records to their prior state or to an updated state at the discretion of the user. Such means places control into the hands of the tenant or the tenant's users who will possess the intimate knowledge of their own information necessary to correct such external logical errors. This is particularly important for a multitenant database implementation since the tenants utilize the database as a service and do not have access to the underlying database system's administrative controls as would be the case for a single tenant database environment where the tenant owns and manages the entire database implementation.

According to another embodiment, the user can additionally be presented with a view at the UI of all records that will be affected by the proposed changes by checking the selection at element 481. For instance, a user after selecting which records to revert or modify can be presented with a verification or confirmation screen at the UI asking them to confirm the proposed changes and showing the user those records that will be modified or directly affected by the compensating transactions. For instance, it may be that subsequent database transactions were processed subsequent to a malicious hack, and the proposed changes, while reverting the affects of the erroneous transactions, will also revert properly processed transactions subsequent to the hack, and may therefore require additional review or modification of the proposed compensating transactions by the user, all of which is enabled at the UI interface presented to the user in accordance with such embodiments. Such changes may be processed through the application as well to ensure that any necessary application logic is also applied to the transaction presented to the database.

Physical corruption issues or logical corruption may also occur at the database engine level. For instance, a record may be created or deleted without a corresponding change to the index. Therefore, in accordance with another embodiment, a count or checksum is maintained for rows inserted into the tables of the database and a corresponding count or checksum is maintained for rows of the tables in the database represented by an index. A check may then verify whether the two are in sync. Although an administrator or other person may be notified, it is also feasible to trigger a rebuild of the index without the knowledge of the tenants, users, or administrator.

CRC checks may additionally be maintained on blocks to check for corruption and then if corruption is detected through a scan, users affected by the corrupted block can be notified via an error message or other trigger without requiring the entire database be taken offline and impacting those users having no data associated the corrupted block. In such a way, only a limited number of rows, records, or transactions that are actually impacted by the corruption need to be isolated thus leaving the system available for the overwhelming majority of other records and users.

Figure 5A:
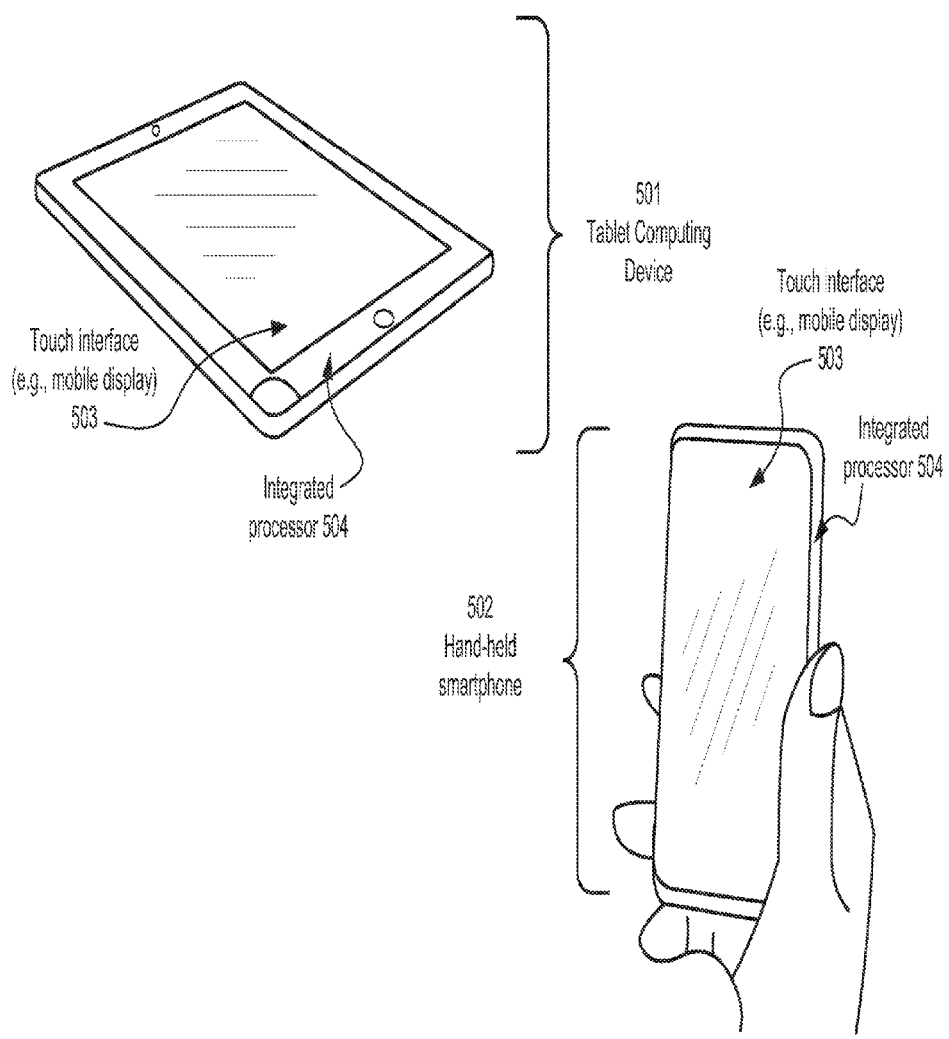
FIG. 5A depicts a tablet computing device and a handheld smartphone each having a circuitry integrated therein as described in accordance with the embodiments.

FIG. 5A depicts a tablet computing device 501 and a hand-held smartphone 502 each having a circuitry integrated therein as described in accordance with the embodiments. As depicted, each of the tablet computing device 501 and the hand-held smartphone 502 include a touch interface 503 (e.g., a touchscreen or touch sensitive display) and an integrated processor 504 in accordance with disclosed embodiments.

For example, in one embodiment, a system embodies a tablet computing device 501 or a hand-held smartphone 502, in which a display unit of the system includes a touchscreen interface 503 for the tablet or the smartphone and further in which memory and an integrated circuit operating as an integrated processor are incorporated into the tablet or smartphone, in which the integrated processor implements one or more of the embodiments described herein. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

FIG. 5B is a block diagram 500 of an embodiment of tablet computing device, a smart phone, or other mobile device in which touchscreen interface connectors are used. Processor 510 performs the primary processing operations. Audio subsystem 520 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 510.

Display subsystem 530 represents hardware (e.g., display devices) and software (e.g., drivers) components that provide a visual and/or tactile display for a user to interact with the tablet computing device or smart phone. Display subsystem 530 includes display interface 532, which includes the particular screen or hardware device used to provide a display to a user. In one embodiment, display subsystem 530 includes a touchscreen device that provides both output and input to a user.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to the tablet computing device or smart phone through which a user might interact. In one embodiment, I/O controller 540 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 550 that manages battery power usage, charging of the battery, and features related to power saving operation. Memory subsystem 560 includes memory devices for storing information in the tablet computing device or smart phone. Connectivity 570 includes hardware devices (e.g., wireless and/or wired connectors and communication hardware) and software components (e.g., drivers, protocol stacks) to the tablet computing device or smart phone to communicate with external devices. Cellular connectivity 572 may include, for example, wireless carriers such as GSM (global system for mobile communications), CDMA (code division multiple access), TDM (time division multiplexing), or other cellular service standards). Wireless connectivity 574 may include, for example, activity that is not cellular, such as personal area networks (e.g., Bluetooth), local area networks (e.g., WiFi), and/or wide area networks (e.g., WiMax), or other wireless communication.

Peripheral connections 580 include hardware interfaces and connectors, as well as software components (e.g., drivers, protocol stacks) to make peripheral connections as a peripheral device ("to" 582) to other computing devices, as well as have peripheral devices ("from" 584) connected to the tablet computing device or smart phone, including, for example, a "docking" connector to connect with other computing devices. Peripheral connections 580 include common or standards-based connectors, such as a Universal Serial Bus (USB) connector, DisplayPort including MiniDisplayPort (MDP), High Definition Multimedia Interface (HDMI), Firewire, etc.

FIG. 6 is a flow diagram illustrating a method 600 for fixing logical or physical corruption in databases using LSM trees in accordance with disclosed embodiments. Method 600 may be performed by processing logic that may include hardware (e.g., circuitry, dedicated logic, programmable logic, microcode, etc.), software (e.g., instructions run on a processing device to perform various operations such as storing records, processing transactions, recording, logging, identifying errors and corruption, correcting errors and corruption, displaying, retrieving, communicating, updating, applying, committing, querying, executing, generating, exposing, transmitting, sending, returning, etc., in pursuance of the systems, apparatuses, and methods, as described herein. For example, the computing architecture (e.g., within production environment 111) of host organization 110 as depicted at FIG. 1, the hand-held smartphone 502 or mobile tablet computing device 501 depicted at FIG. 5A, the machine 800 at FIG. 8, or the system 900 at FIG. 9, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 605, processing logic stores records in a LSM database at a host organization.

At block 610, processing logic processes transactions to the LSM database by writing the transactions into immutable extents for subsequent merge into the LSM database.

At block 615, processing logic records a history of the transactions in a log.

At block 620, processing logic identifies corruption in at least one of the records of the LSM database represented within the immutable extents prior to use of the immutable extents in the LSM database.

At block 625, processing logic corrects the identified corruption to the at least one of the records of the LSM database based at least in part on the recorded history of the transactions in the log during live operation of the LSM database.

For instance, the identified corruption may be logical corruption or physical corruption. In the case of physical corruption, the corruption may be rectified without user interaction, for instance, by replaying transactions from a transaction log to create a top level extent or by re-creating an extent at subordinate levels of the LSM tree by replaying merges that preceded the extent being recreated. Thus, although the extent is immutable, it may nevertheless be replaced by a re-created extent. Alternatively, where the corruption is of a logical type, the logical corruption may be rectified by presenting a tenant or user with past changes to the stored data and providing a means, such as a user interface and logical corruption editor, by which the logical corruption may be fixed at the discretion of the user.

According to another embodiment of method 600, correcting the identified corruption to the at least one of the records of the LSM database includes at least one of: restoring a modified record to a prior state; deleting an erroneously inserted record; restoring an erroneously deleted record; or changing one or more field values of an erroneously modified record.

According to another embodiment of method 600, the corruption constitutes logical corruption and correcting the identified logical corruption to the at least one of the records of the LSM database includes: reading a stored record from the LSM database having a corresponding transaction pending merge processing within the immutable extents; reading historical transaction data from the log; generating a compensating transaction based on the compensating transaction data from the log and the stored record from the LSM database; and sending the compensating transaction to the LSM database.

According to another embodiment of method 600, sending the compensating transaction to the LSM database includes issuing the compensating transaction to the LSM database as a new transaction, in which the new transaction is written to a transaction log of the LSM database when committed and remains within the transaction log until the LSM database generates a new top level extent through a flush of the transaction log to generate the new top level extent; and further in which subsequent merge processing counteracts the corresponding transaction pending merge processing within the immutable extents for the stored record read from the LSM database.

According to another embodiment of method 600, the corruption constitutes physical corruption within one of a top level extent at the top level of the LSM database or within a previously merged extent at a subordinate level of the LSM database; and in which correcting the identified physical corruption includes one of: (a) generating a new top level extent for the top level of the LSM database from the transaction logs and replacing the top level extent determined to have physical corruption with the new top level extent generated, or (b) generating a new subordinate level extent by re-merging previously merged extents marked for deletion from the LSM tree but kept for redundancy and replacing the previously merged extent at a subordinate level determined to have physical corruption with the new subordinate level extent generated.

According to another embodiment of method 600, identifying corruption in at least one of the records of the LSM database includes: triggering error messages to users for any queries to the LSM database having the identified corruption within the query claim scope; and maintaining availability and accessibility to the LSM database to database queries.

According to another embodiment, method 600 further includes: presenting a historical records view to a user interface based on the log, the historical records view displaying one or more records updated during a time range configurable at the user interface.

According to another embodiment, method 600 further includes: receiving user input selecting one or more of the records updated during the time range; and receiving user input specifying corruption edits to the one or more records.

According to another embodiment of method 600, the corruption constitutes logical corruption in which the method further includes presenting a historical records view to a user interface based on the log, the historical records view displaying one or more records updated during a time range configurable at the user interface.

According to a related embodiment, method 600 further includes receiving user input selecting one or more of the records updated during the time range; and receiving user input specifying edits to rectify the logical corruption in the one or more records.

According to another embodiment of method 600, the user input specifying corruption edits to the one or more records includes user input specifying one or more of: a selected record erroneously inserted into the LSM database to be deleted from the LSM database via a compensating delete transaction; a selected record erroneously deleted from the LSM database to be restored to the LSM database via a compensating insert transaction; a selected record erroneously modified within the LSM database to be reverted to a prior state via a compensating update transaction; and a selected record erroneously modified within the LSM database to be updated to a new state via a compensating update transaction.

According to another embodiment, method 600 further includes: presenting a preview of other records impacted by a proposed compensating transaction to the user interface prior to proceeding with the proposed compensating transaction.

According to another embodiment, method 600 further includes: storing an Organization Identifier (OrgID) and a User Identifier (UserID) within the recorded history of the transactions in the log, the OrgID and UserID identifying which organization and which user is associated with every transaction recorded. According to such an embodiment, presenting the historical records view to the user interface comprises restricting the historical records displayed based on an evaluation of the OrgID and the UserID stored in the log and access rights associated with a user of the user interface.

According to another embodiment, method 600 further includes: receiving a selection from the user interface specifying one of the displayed records updated during the time range; presenting a record editor to the user interface having the record corresponding to the selection populated therein; receiving user input to the fields of the record corresponding to the selection from the record editor at the user interface; and generating a compensating transaction for the record corresponding to the selection using the user input to the fields of the record.

According to another embodiment of method 600, the host organization implements the method via computing architecture of the host organization including at least the processor and the memory; in which a user interface operates at a user client device remote from the host organization and communicatively interfaces with the host organization via a public Internet; and in which the host organization operates as a cloud based service provider to the user client device.

According to another embodiment of method 600, the host organization provides a multi-tenant database system via the LSM database and the computing architecture of the host organization, the multi-tenant database system having elements of hardware and software that are shared by a plurality of separate and distinct customer organizations, each of the separate and distinct customer organizations being remotely located from the host organization.

According to another embodiment of method 600, identifying corruption in at least one of the records of the LSM database includes one of: identifying physical corruption responsive to a physical corruption error triggered by the LSM database; or identifying logical corruption responsive user input at a logical corruption user interface, the user input indicating a selected record is to be corrected via a compensating transaction.

According to a particular embodiment, there is non-transitory computer readable storage media having instructions stored thereon that, when executed by a processor in a host organization, the instructions cause the host organization to perform operations including: storing records in a LSM database at the host organization; processing transactions to the LSM database by writing the transactions into immutable extents for subsequent merge into the LSM database; recording a history of the transactions in a log; identifying corruption in at least one of the records of the LSM database represented within the immutable extents prior to use of the immutable extents in the LSM database; and correcting the identified corruption to the at least one of the records of the LSM database based at least in part on the recorded history of the transactions in the log during live operation of the LSM database.

Figure 7A:
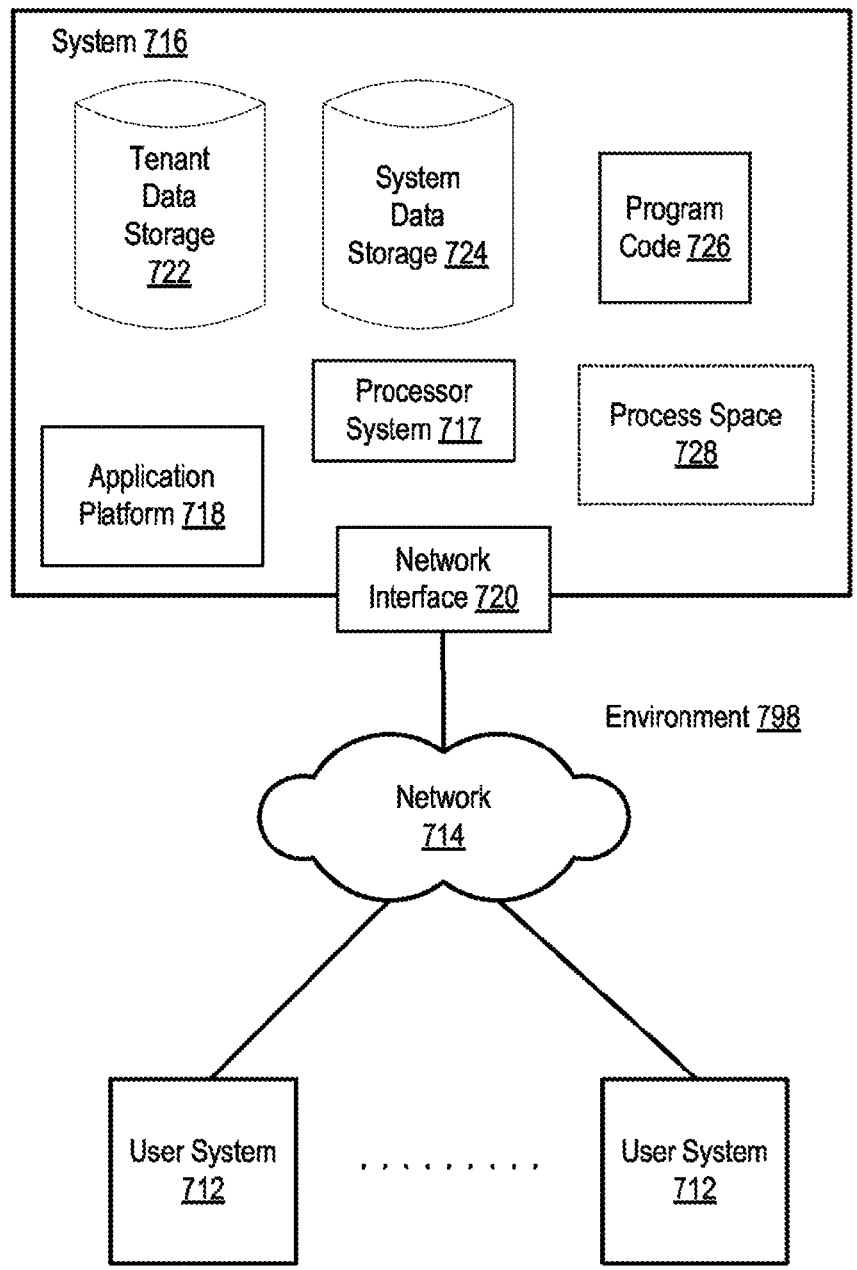
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
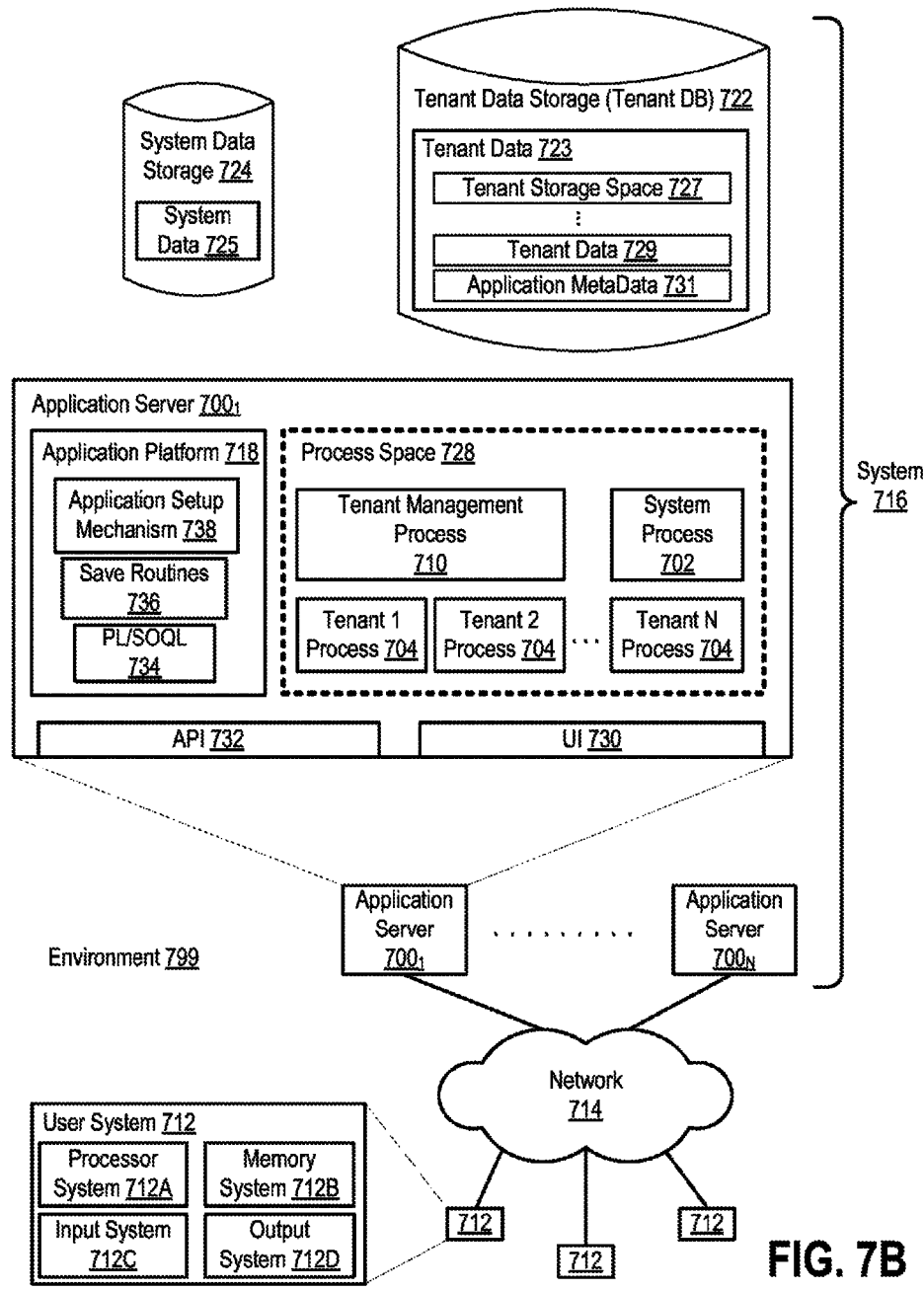
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server 700$_1$ might be coupled via the network 714 (e.g., the Internet), another application server 700$_{N-1}$ might be coupled via a direct network link, and another application server 700$_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a historical record viewer engine 824 having display logic and functionality to present the historical state of records and associated transactions for such records to a user interface. The logical corruption UI engine 823 also of main memory 804 presents a user interface through which a user can modify selected records to correct or otherwise rectify corruption in the LSM database. The logical corruption editor 825 generates compensating transactions and if necessary replacement or corrected extents to the LSM database on behalf of a user based on the user's selections and modifications at a UI. Main memory 804 and its sub-elements are operable in conjunction with processing logic 826 and processor 802 to perform the methodologies discussed herein. The computer system 800 may additionally or alternatively embody the server side elements as described above.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

Figure 9:
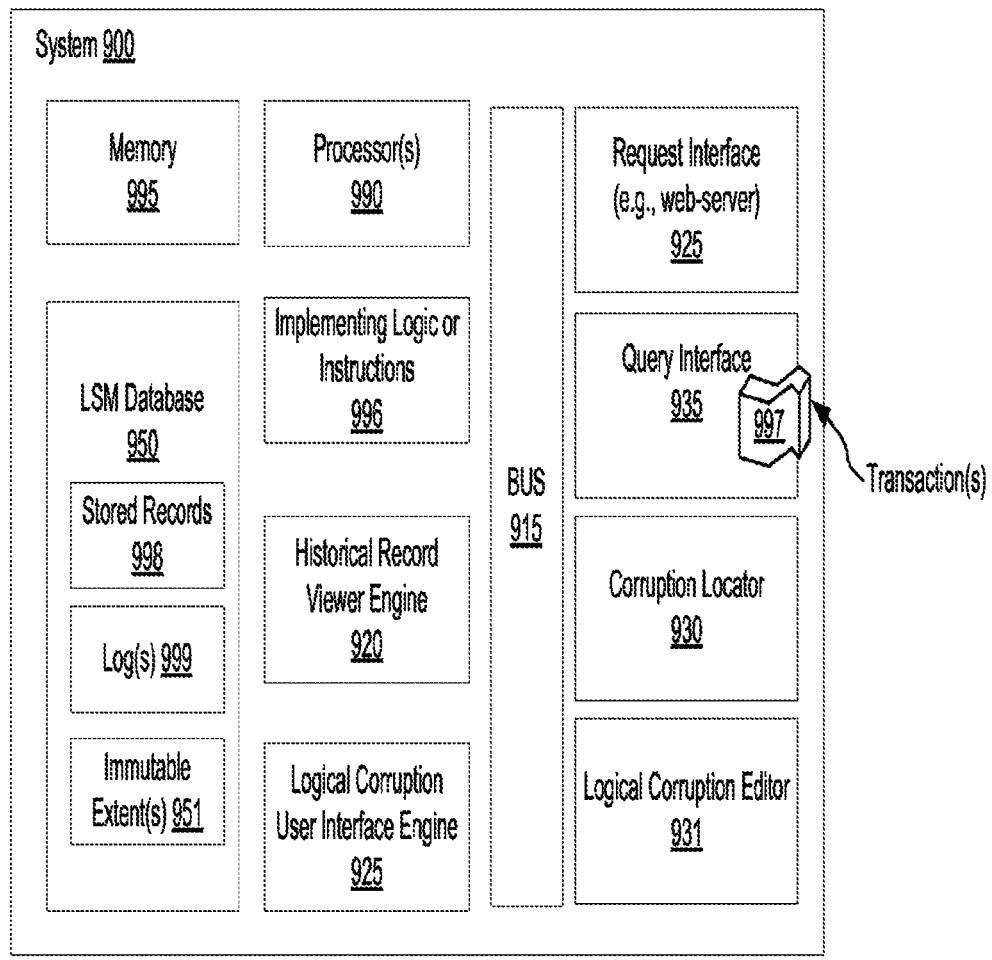
FIG. 9 shows a diagrammatic representation of a system in accordance with which embodiments may operate, be installed, integrated, or configured.

FIG. 9 shows a diagrammatic representation of a system 900 in which embodiments may operate, be installed, integrated, or configured.

In accordance with one embodiment, there is a system 900 having at least a processor 990 and a memory 995 therein to execute implementing logic and/or instructions 996. According to such an embodiment, the system 900 further includes an LSM database 950 to store records 998; a query interface 935 to process transactions 997 to the LSM database 950 by writing the transactions into immutable extents 951 for subsequent merge into the LSM database 950; a log 999 to record a history of the transactions 997; a corruption locator 930 to identify corruption in at least one of the records 998 of the LSM database 950 represented within the immutable extents 951 prior to use of the immutable extents 951 in the LSM database 950; and a logical corruption editor 931 to correct the identified corruption to the at least one of the records 998 of the LSM database 950 based at least in part on the recorded history of the transactions in the log 999 during live operation of the LSM database 950.

According to another embodiment, the system 900 further includes a historical record viewer engine 920 to present a historical records view to a user interface based on the log 999, the historical records view to display one or more records updated during a time range configurable at the user interface.

According to another embodiment, the system 900 further includes a logical corruption user interface engine 925 to receive user input selecting one or more of the records updated during the time range; and in which the logical corruption user interface engine 925 is to further receive user input specifying corruption edits to the one or more records.

According to another embodiment, the system 900 further includes a web-server 925 to implement the historical record view engine and to receive the user input at the system from a client device operating at one of a plurality of customer organizations remote from the system; in which the plurality of customer organizations communicably interface with the system 900 via a public Internet; and in which each customer organization is an entity selected from the group consisting of: a separate and distinct remote organization, an organizational group within the host organization, a business partner of the host organization, or a customer organization that subscribes to cloud computing services provided by the host organization.

According to another embodiment of the system 900, a user interface operates at a user client device remote from the system and communicatively interfaces with the system via a public Internet; in which the system operates at a host organization as a cloud based service provider to the user client device; and in which the cloud based service provider hosts the customer data within a multi-tenant database system at a host organization on behalf of the user.

Bus 915 interfaces the various components of the system 900 amongst each other, with any other peripheral(s) of the system 900, and with external components such as external network elements, other machines, client devices, etc., including communicating with such external devices via a network interface over a LAN, WAN, or the public Internet.

According to another embodiment, the system 900 is embodied within one of a tablet computing device or a hand-held smartphone such as those depicted at FIGS. 5A and 5B.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a host infrastructure having a processor and a memory therein, wherein the method comprises:
    causing records to be stored in a log-structured merge (LSM) storage;
    writing transactions to a transaction log and then flushing at least a portion of the transaction log to cause the at least the portion of the transaction log to be stored into one or more extents in the LSM storage, wherein the transactions are updates to, deletions of, or creation of records;
    receiving an identification of corruption in:
        at least one corrupted transaction of the transactions,
        at least one corrupted record of the records, or
        both;
    locating, in response to the receiving the identification of the corruption, compensating transaction data in the transaction log, wherein the compensating transaction data is usable to restore the at least one corrupted transaction, the at least one corrupted record, or both;
    generating a compensating transaction based on the compensating transaction data from the transaction log and the stored record from the LSM storage; and
    sending the compensating transaction to the LSM storage.

2. The method of claim 1, wherein the sending further comprises directly applying a compensating SQL transaction as the compensating transaction.

3. The method of claim 1, wherein the sending further comprises applying, via an application program interface, a compensating SQL transaction as the compensating transaction.

4. The method of claim 1, wherein the compensating transaction includes a compensating record which is an uncorrupted version of a logically-corrupted record, and further comprising adding the compensating record to supersede the logically-corrupted record.

5. The method of claim 4, further comprising performing a merge to delete the logically-corrupted record.

6. The method of claim 1, further comprising notifying a user when the causing the records to be stored is an extraordinary transaction.

7. The method of claim 6, wherein the causing the records to be stored is an extraordinary transaction when at least one of:
    one or more edits to the records are made outside of normal business hours;
    the one or more edits to the records originate from a location which does not match prior usage;
    the one or more edits to the records originate from a location which does not match expected usage;
    the one or more edits to the records originate from an IP address which does not match prior usage; or
    the one or more edits to the records originate from an IP address which does not match expected usage.

8. The method of claim 1, further comprising identifying corruption in at least one of the records of the LSM storage by triggering error messages to users for any queries to the LSM storage having the identified corruption within the query claim scope.

9. The method of claim 1, wherein the corruption constitutes logical corruption; and further comprising presenting a historical records view to a user interface based on the transaction log, the historical records view displaying one or more corrupted records updated during a time range configurable at the user interface.

10. The method of claim 9, further comprising:
    receiving a first user input selecting one or more of the corrupted records updated during the time range; and
    receiving a second user input specifying one or more edits to rectify the logical corruption in the one or more corrupted records.

11. The method of claim 9, further comprising presenting a preview of other records affected by a proposed compensating transaction to the user interface prior to proceeding with the proposed compensating transaction.

12. The method of claim 9, further comprising:
    storing an Organization Identifier (OrgID) and a User Identifier (UserID) within the recorded history of the transactions in the transaction log, the OrgID and UserID identifying which infrastructure and which user is associated with every transaction recorded; and
    wherein presenting the historical records view to the user interface comprises restricting the historical records displayed based on an evaluation of the OrgID and the UserID stored in the log and based on access rights associated with a user of the user interface.

13. The method of claim 9, further comprising:
    receiving a selection from the user interface specifying one of the displayed corrupted records updated during the time range;
    presenting a record editor to the user interface having the corrupted record corresponding to the selection populated therein;
    receiving user input to the fields of the corrupted record corresponding to the selection from the record editor at the user interface; and
    generating a compensating transaction for the corrupted record corresponding to the selection using the user input to the fields of the record.

14. The method of claim 1, wherein the host infrastructure implements the method via computing architecture of the host infrastructure including at least the processor and the memory, a user interface operates at a user client device located remotely from the host infrastructure and communicatively interfaces with the host infrastructure via a public Internet, and the host infrastructure operates as a cloud-based service provider to the user client device.

15. The method of claim 1, wherein the host infrastructure provides a multi-tenant database system via the LSM storage and the computing architecture of the host infrastructure, the multi-tenant database system has elements of hardware and software which are shared by a plurality of separate and distinct customer infrastructures, and each of the separate and distinct customer infrastructures is remotely located from the host infrastructure.

16. The method of claim 1, further comprising identifying corruption in at least one of the records of the LSM storage by identifying logical corruption in response to user input at a logical corruption user interface, wherein the user input indicates that a selected record is to be corrected via a compensating transaction.

17. A non-transitory computer readable storage media having instructions stored thereon which, when executed by a processor in a host infrastructure, cause the host infrastructure to perform operations, comprising:
 causing records to be stored in a log-structured merge (LSM) storage;
 writing transactions to a transaction log and then flushing at least a portion of the transaction log to cause the at least the portion of the transaction log to be stored into one or more extents in the LSM storage, wherein the transactions are updates to, deletions of, or creation of records;
 receiving an identification of corruption in:
  at least one corrupted transaction of the transactions,
  at least one corrupted record of the records, or
  both;
 locating, in response to the receiving the identification of the corruption, compensating transaction data in the transaction log, wherein the compensating transaction data is usable to restore the at least one corrupted transaction, the at least one corrupted record, or both;
 generating a compensating transaction based on the compensating transaction data from the transaction log and the stored record from the LSM storage; and
 sending the compensating transaction to the LSM storage.

18. The non-transitory computer readable storage media of claim 17, wherein the sending further comprises directly applying a compensating SQL transaction as the compensating transaction.

19. The non-transitory computer readable storage media of claim 17, wherein the sending further comprises applying, via an application program interface, a compensating SQL transaction as the compensating transaction.

20. The non-transitory computer readable storage media of claim 17, wherein the compensating transaction includes a compensating record which is an uncorrupted version of a logically-corrupted record, and further comprising adding the compensating record to supersede the logically-corrupted record.

21. The non-transitory computer readable storage media of claim 20, wherein the instructions cause the processor to perform further operations comprising:
 performing a merge to delete the logically-corrupted record.

22. The non-transitory computer readable storage media of claim 17, wherein the instructions cause the processor to perform further operations comprising:
 notifying a user when the causing the records to be stored is an extraordinary transaction.

23. The non-transitory computer readable storage media of claim 22, wherein the causing the records to be stored is an extraordinary transaction when at least one of:
 one or more edits to the records are made outside of normal business hours;
 the one or more edits to the records originate from a location which does not match prior usage;
 the one or more edits to the records originate from a location which does not match expected usage;
 the one or more edits to the records originate from an IP address which does not match prior usage; or
 the one or more edits to the records originate from an IP address which does not match expected usage.

24. The non-transitory computer readable storage media of claim 17, wherein the instructions cause the processor to perform further operations comprising:
 identifying corruption in at least one of the records of the LSM storage by triggering error messages to users for any queries to the LSM storage having the identified corruption within the query claim scope.

25. The non-transitory computer readable storage media of claim 17, wherein the corruption constitutes logical corruption; and further comprising presenting a historical records view to a user interface based on the transaction log, the historical records view displaying one or more corrupted records updated during a time range configurable at the user interface.

26. The non-transitory computer readable storage media of claim 25, wherein the instructions cause the processor to perform further operations comprising:
 receiving a first user input selecting one or more of the corrupted records updated during the time range; and
 receiving a second user input specifying one or more edits to rectify the logical corruption in the one or more corrupted records.

27. The non-transitory computer readable storage media of claim 25, wherein the instructions cause the processor to perform further operations comprising:
 presenting a preview of other records affected by a proposed compensating transaction to the user interface prior to proceeding with the proposed compensating transaction.

28. The non-transitory computer readable storage media of claim 25, wherein the instructions cause the processor to perform further operations comprising:
 storing an Organization Identifier (OrgID) and a User Identifier (UserID) within the recorded history of the transactions in the transaction log, the OrgID and UserID identifying which infrastructure and which user is associated with every transaction recorded,
 wherein presenting the historical records view to the user interface comprises restricting the historical records displayed based on an evaluation of the OrgID and the UserID stored in the log and based on access rights associated with a user of the user interface.

29. The non-transitory computer readable storage media of claim 25, wherein the instructions cause the processor to perform further operations comprising:
 receiving a selection from the user interface specifying one of the displayed corrupted records updated during the time range;
 presenting a record editor to the user interface having the corrupted record corresponding to the selection populated therein;
 receiving user input to the fields of the corrupted record corresponding to the selection from the record editor at the user interface; and
 generating a compensating transaction for the corrupted record corresponding to the selection using the user input to the fields of the record.

30. The non-transitory computer readable storage media of claim 17, wherein the host infrastructure implements the method via computing architecture of the host infrastructure including at least the processor and the memory, a user interface operates at a user client device located remotely from the host infrastructure and communicatively interfaces with the host infrastructure via a public Internet, and the host infrastructure operates as a cloud-based service provider to the user client device.

31. The non-transitory computer readable storage media of claim 17, wherein the host infrastructure provides a multi-tenant database system via the LSM storage and the computing architecture of the host infrastructure, the multi-tenant database system has elements of hardware and software which are shared by a plurality of separate and distinct customer infrastructures, and each of the separate and distinct customer infrastructures is remotely located from the host infrastructure.

32. The non-transitory computer readable storage media of claim 17, wherein the instructions cause the processor to perform further operations comprising:
   identifying corruption in at least one of the records of the LSM storage by identifying logical corruption in response to user input at a logical corruption user interface, wherein the user input indicates a selected record is to be corrected via a compensating transaction.

33. A system, comprising:
   a log-structured merge (LSM) storage configured to store records;
   a query interface configured to write transactions to a transaction log and then flush at least a portion of the transaction log to cause the at least the portion of the transaction log to be stored into one or more extents in the LSM storage, wherein the transactions are updates to, deletions of, or creation of records;
   a transaction log configured to record a history of the transactions;
   a logical corruption locator configured to locate logical corruption in at least one of the transactions or the records of the LSM storage; and
   a logical corruption editor configured to:
      receive an identification of corruption in:
         at least one corrupted transaction of the transactions, at least one corrupted record of the records, or both; and
      locate, in response to the receiving the identification of the corruption, compensating transaction data in the transaction log, wherein the compensating transaction data is usable to restore the at least one corrupted transaction, the at least one corrupted record, or both;
      generate a compensating transaction based on the compensating transaction data from the transaction log and the stored record from the LSM storage; and
      send the compensating transaction to the LSM storage.

34. The system of claim 33, further comprising a historical record viewer engine configured to present, based on the transaction log, a historical records view via a user interface, wherein the historical records view displays one or more records updated during a time range configurable at the user interface.

35. The system of claim 34, further comprising a logical corruption user interface engine configured to:
   receive a first user input selecting one or more of the corrupted records updated during the time range; and
   receive a second user input specifying edits to rectify the logical corruption in the one or more corrupted records.

36. The system of claim 33, further comprising a user interface configured to:
   operate at a user client device, wherein the user client device is located remotely from the system; and
   communicatively interface with the system via a public Internet,
   wherein the system is configured to operate at a host infrastructure as a cloud-based service provider to the user client device, and the cloud-based service provider is configured to host customer data within a multi-tenant database system at the host infrastructure on behalf of the user.

* * * * *